United States Patent [19]
McClure

[11] 3,722,638
[45] Mar. 27, 1973

[54] POWER ABSORBER
[75] Inventor: John W. McClure, Charleston, S.C.
[73] Assignee: Auco Corporation, Charleston, S.C.
[22] Filed: Aug. 27, 1971
[21] Appl. No.: 175,565

[52] U.S. Cl. .....................188/280, 188/317, 267/34
[51] Int. Cl. ............................F16f 9/19, F16f 13/00
[58] Field of Search......188/316, 317, 322, 280, 282, 188/290, 295; 267/34

[56] References Cited

UNITED STATES PATENTS 1,078,885  11/1913  Thomas..............................188/284
1,242,103  10/1917  Hunter...........................188/317 X Primary Examiner—George E. A. Halvosa
Attorney—Charles M. Hogan et al.

[57] ABSTRACT

A power absorber combining the properties of a fluid filled dashpot with those of a rotating disk in fluid as employed in water brakes is disclosed. The power absorber provides absorption through the use of a rotating rotor which is moved linearly through the fluid medium.

3 Claims, 3 Drawing Figures

3,722,638
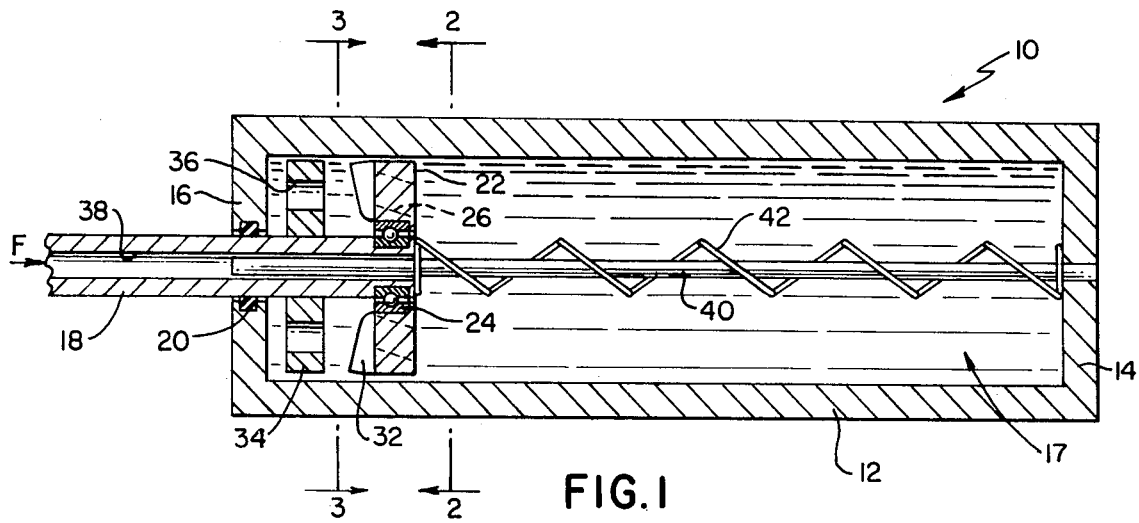
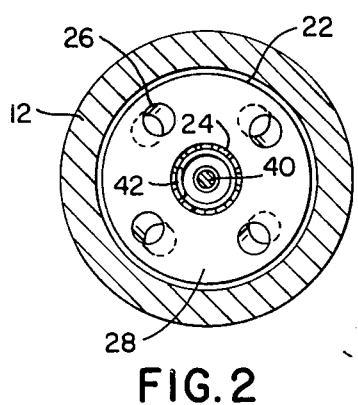
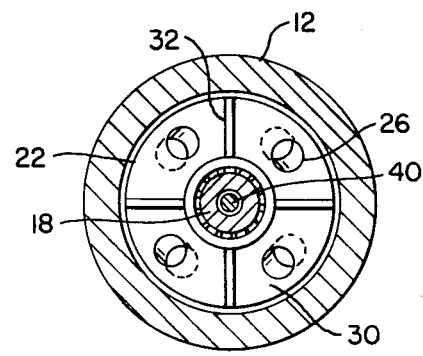
INVENTOR.
JOHN W. McCLURE
BY Charles M. Hogan
Eugene C. Goodale
ATTORNEYS

POWER ABSORBER

BACKGROUND OF THE INVENTION

This invention relates to the absorption of power and more particularly to a linear rotating power absorber.

Numerous power absorbing devices are known in the art. Such power absorbing devices may broadly be classified into two categories, i.e., hydraulic shock absorption and absorption dynamometer or water brake. Water brakes inherently dissipate power through the rotation of a fan or air screw to transfer the kinetic energy of the wheel to the braking fluid. Such devices are normally complex in construction and have limited application. Shock absorbers are most generally known by their use on automobiles and door closures. In these devices, a piston is urged through a fluid medium and power is absorbed by the fluid being urged from one side of the piston to the other side. The shock absorbers generally have valving structure associated therewith to enhance the absorbing performance.

Each of the aforementioned power absorbers have definite absorbing qualities which are useful. Accordingly, it is an object of this invention to provide a power absorber which combines the properties of a fluid filled dashpot with those of a dynamometer to provide enhanced power absorbing capabilities.

A further object of this invention is to provide a power absorber having but few parts of simple structure assembled in a compact form to optimize the power absorbing factors.

SUMMARY OF THE INVENTION

This invention provides an improved power absorber. The power absorber includes a freely rotatable rotor which is linearly accelerated through a fluid medium. Apertures biased through the rotor impart a tangential momentum to the fluid causing said rotor to rotate. Blades attached to the rotor engage the surrounding fluid to counter the rotation of the rotor, thereby absorbing power. A stator follower provides additional power absorption as in waterbrakes.

Other objects, details, uses and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which:

FIG. 1 is a diagrammatic sectional view of the power absorber of this invention;

FIG. 2 is a view taken on line 2—2 of FIG. 1; and

FIG. 3 is a view taken on line 3—3 of FIG. 1.

DESCRIPTION OF THE ILLUSTRATED EMBODIMENT

Reference is now made to FIG. 1 of the drawings which illustrates one exemplary embodiment of the improved power absorber of this invention, which is designated generally by the reference numeral 10. The power absorber 10 comprises a housing 12 being closed at one end 14 and having the end 16 provided with an aperture therethrough in which a rod or shaft 18 is mounted for axial movement relative to the housing 12. The housing 12 and ends 14–16 define a chamber 17 which is filled with a working fluid. Suitable sealing means 20 provide a fluid seal between the housing 12 and shaft 18.

A rotor 22 is located at the end of shaft 18. Rotor 22 is mounted on suitable bearing means 24 for rotational movement about the axis of shaft 18.

The rotor 22 is formed with a plurality of apertures 26 therethrough. As best seen in FIGS. 2 and 3, the apertures 26 are inclined from the forward face 28 of the rotor to the rearward face 30. It is thus seen that the apertures 26 are biased and non-parallel to the axis of shaft 18. A plurality of fins or blades 32 is formed at the rearward surface 30 of the rotor 22.

Referring once again to FIG. 1, a stator follower 34 having a plurality of apertures 36 therethrough is secured to the shaft 18 in spaced relation to the rotor 22.

The shaft 18 is provided with an axial bore 38 therethrough for receiving a rod 40 which is mounted in the end 14 of the housing 12. Rod 40 serves as an axial guide to keep the shaft 18 centered during linear movement of the shaft 18 relative to the housing 12. Suitable restoration means, such as a spring 42, is mounted about the rod 40 acting at one end against the shaft 18 and at the other end against the housing end 14.

In operation, when a force F, of sufficient magnitude, in the direction of the arrow is applied to shaft 18, the shaft 18 will move linearly relative to the housing 12. Linear movement of the shaft 18 propels the rotor 22 through the fluid and forces the fluid through the biased apertures 26. This action will cause the rotor 22 to rotate in a clockwise direction as viewed in FIG. 3. Fluid exiting from the rotor 22 will have a tangential momentum. The blades 32 will act against the tangential momentum of the fluid to in effect work against the rotation of the rotor 22. The stator follower 34 is also moved linearly through the fluid medium due to the linear movement of the shaft 18. It can thus be seen that the rotating blades 32 in conjunction with the stator follower 34 act on the fluid to absorb power essentially by viscous shear and momentum exchange. It can be further seen that additional work and power absorbed can be accomplished by accelerating the mass of the system in both linear and rotational modes. When the force F is removed from the shaft 18, the spring 42 will urge the rotor 22 and shaft 18 to the initial position. It should further be noted that the spring 42 also acts as a shock absorber in that the spring force must first be overcome before there is any linear movement of the shaft 18 relative to the housing 12.

While the power absorber hereinabove described has been specifically described and shown for having the force F applied to the shaft 18, the same results may be obtained by application of the force F to the housing 12 while maintaining the shaft 18 stationary. In addition, the same results may be obtained by applying linear force in the opposite direction to the housing and shaft.

It can be seen that this invention provides a power absorber which combines the properties of a fluid filled dashpot with the properties of a rotating disk in fluid as employed in water brakes. The power absorber of this invention is of simple and economical construction, has few parts and provides enhanced power absorbing features.

While a present exemplary embodiment of this invention has been illustrated and described it will be recognized that this invention may be otherwise variously embodied and practiced by those skilled in the art.

What is claimed is:

1. A power absorber comprising:
   a housing defining a fluid thereof; chamber, said housing having an aperture at one end thereof;
   a shaft slidably mounted through said one end for linear movement relative to said housing;
   a rotor rotatably mounted on said shaft within said housing, said rotor being formed with a plurality of biased apertures therethrough wherein linear movement of said shaft relative to said housing causes said rotor to be forced through the working fluid causing said rotor to be rotated wherein power absorption occurs due to said rotor rotation;
   a plurality of axially projecting blades projecting from the rearward face of said rotor, said blades acting on said fluid exiting from said rotor apertures to counter the rotational movement of said rotor; and
   a stator follower secured to said shaft in spaced relation behind said rotor, said follower having a plurality of apertures therethrough wherein linear movement of said shaft relative to said housing causes said blades and follower to act on the fluid to provide power absorption by viscous shear and momentum exchange.

2. A power absorber as set forth in claim 1 further comprising a rod extending axially through said chamber;
   and in which said shaft is formed with an axial bore therethrough for receiving said rod wherein said rod guides the linear movement of said shaft and means for restoring said shaft to an initial position relative to said housing.

3. A power absorber as set forth in claim 2 in which said restoring means is a spring mounted about said rod, one end of said spring acting on the end of said shaft and the other end acting against said housing.

* * * * *